United States Patent
Honda

(10) Patent No.: US 9,041,835 B2
(45) Date of Patent: May 26, 2015

(54) SELECTIVE COMBINING OF IMAGE DATA

(75) Inventor: Yoshiaki Honda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 13/880,019

(22) PCT Filed: Sep. 29, 2011

(86) PCT No.: PCT/JP2011/073033
§ 371 (c)(1),
(2), (4) Date: Apr. 17, 2013

(87) PCT Pub. No.: WO2012/063580
PCT Pub. Date: May 18, 2012

(65) Prior Publication Data
US 2013/0222641 A1   Aug. 29, 2013

(30) Foreign Application Priority Data
Nov. 10, 2010   (JP) ................. 2010-252207

(51) Int. Cl.
H04N 5/217 (2011.01)
G06K 9/40 (2006.01)
H04N 5/21 (2006.01)
G06T 5/00 (2006.01)

(52) U.S. Cl.
CPC ............. *H04N 5/217* (2013.01); *H04N 5/21* (2013.01); *G06T 5/002* (2013.01); *G06T 2207/20016* (2013.01)

(58) Field of Classification Search
CPC ....... H04N 5/217; H04N 5/2173; H04N 5/21; G06T 5/002; G06T 2207/20182; G06T 2207/20192

USPC .............. 348/222.1, 241, 252, 235; 382/275, 382/260, 264
See application file for complete search history.

(56) References Cited

U.S. PATENT DOCUMENTS

| | | | |
|---|---|---|---|
| 7,072,524 B1 * | 7/2006 | Yamada | 382/260 |
| 7,248,745 B1 | 7/2007 | Georgiev et al. | |
| 7,856,151 B2 * | 12/2010 | Lei | 382/263 |
| 7,898,583 B2 * | 3/2011 | Wakahara et al. | 348/252 |
| 8,243,173 B2 * | 8/2012 | Utsugi | 348/241 |
| 8,294,791 B2 * | 10/2012 | Iwabuchi | 348/241 |
| 8,345,127 B2 * | 1/2013 | Shohara | 348/241 |
| 8,514,302 B2 * | 8/2013 | Utsugi | 348/241 |

(Continued)

FOREIGN PATENT DOCUMENTS

JP   2008-015741 A   1/2008

*Primary Examiner* — John Villecco
(74) *Attorney, Agent, or Firm* — Fitzpatrick, Cella, Harper & Scinto

(57) ABSTRACT

In an image capturing apparatus, a first image data is stored in a first storage; second image data of a low resolution is generated by the first reducing; enlarged image data is generated; low resolution image data is generated from the first image data through processing that is different from that performed by the first reducing, the low resolution image data have the same pixel count as the first image data and a lower resolution than that of the first image data; one of first image processing in which the first image data is combined with the enlarged image data or second image processing in which the first image data is combined with the low resolution image data is executed; and the processing is switched between the first image processing and the second image processing, according to a shooting operation.

14 Claims, 3 Drawing Sheets

(56) References Cited

U.S. PATENT DOCUMENTS

| | | | |
|---|---|---|---|
| 8,659,684 B2* | 2/2014 | Fukutomi | 348/241 |
| 2004/0042679 A1 | 3/2004 | Yamada | |
| 2004/0091166 A1* | 5/2004 | Yamada | 382/260 |
| 2008/0122953 A1 | 5/2008 | Wakahara et al. | |
| 2008/0159646 A1* | 7/2008 | Katagiri et al. | 382/266 |
| 2008/0253678 A1* | 10/2008 | Li et al. | 382/260 |
| 2009/0059026 A1 | 3/2009 | Katagiri et al. | |
| 2010/0246991 A1* | 9/2010 | Naito | 382/260 |
| 2013/0011081 A1* | 1/2013 | Luo et al. | 382/298 |
| 2013/0222531 A1* | 8/2013 | Hirai | 348/32 |
| 2013/0243318 A1* | 9/2013 | Honda | 382/167 |
| 2014/0022419 A1* | 1/2014 | Hirai | 348/241 |

\* cited by examiner ously. The input image data 1000 is input with image data on which known sensor correction processing such as fixed pattern noise correction or defective pixel correction has been performed. The input image data 1000 is subjected to LPF (low-pass filter) processing with a LPF 1101, and downsampling (reduction) processing in a DS unit 1102 such that image data of a first low resolution is generated, and the resultant data is stored in the memory 1110. Furthermore, image data output from the DS unit 1102 is subjected to LPF processing with a LPF 1201 and downsampling processing in a DS unit 1202 such that image data of a second low resolution that is lower than the first low resolution is generated, and the resultant image data is stored

SELECTIVE COMBINING OF IMAGE DATA

TECHNICAL FIELD

The present invention relates to an image processing technique for image capturing apparatuses.

BACKGROUND ART

For image capturing apparatuses such as a digital camera, precise removal of noise components has been sought due to demands from users for higher sensitivity and higher pixel counts.

As a conventional noise removal method, for example, Japanese Patent Laid-Open No. 2008-015741 discloses a method in which the input signal is divided into a plurality of frequency bands, noise removal and edge preservation are performed on the high frequency component, and the resultant high frequency component is combined with the low frequency component.

SUMMARY OF INVENTION

However, in Japanese Patent Laid-Open No. 2008-015741, a memory for storing data obtained by performing downsampling, in addition to original image data, is required. Since image capturing apparatuses such as a digital camera are equipped with a high-speed continuous shooting function, a moving image recording function and the like in addition to a normal still image shooting function, they require memory capacity and bandwidth. Insufficient memory bandwidth causes a degradation in the frame speed or maximum number of continuous shots of the camera.

The present invention has been made in consideration of the aforementioned problems, and realizes an image processing technique with which high-speed processing is possible while maintaining noise removal performance.

In order to solve the aforementioned problems, the present invention provides an image capturing apparatus comprising: first storage means configured to store first image data; first reducing means configured to reduce the first image data and generate second image data of a low resolution; enlarging means configured to generate enlarged image data, which is obtained by enlarging image data generated by performing predetermined processing on the second image data to a pixel count that is the same as that of the first image data; low resolution image generation means configured to generate low resolution image data from the first image data through processing that is different from that performed by the first reducing means, the low resolution image data having the same pixel count as the first image data and a lower resolution than that of the first image data; combining means configured to execute one of first image processing in which the first image data is combined with the enlarged image data, and second image processing in which the first image data is combined with the low resolution image data; and control means configured to switch processing executed by the combining means between the first image processing and the second image processing, according to a shooting operation.

In order to solve the aforementioned problems, the present invention provides a control method of an image capturing apparatus, comprising: a step of storing first image data; a step of reducing the first image data and generating second image data of a low resolution; a step of generating enlarged image data, which is obtained by enlarging image data generated by performing predetermined processing on the second image data to a pixel count that is the same as that of the first image data; a step of generating low resolution image data from the first image data through processing that is different from that performed in the reducing step, the low resolution image data having the same pixel count as the first image data and a lower resolution than that of the first image data; and a step of switching between execution of first image processing in which the first image data is combined with the enlarged image data and second image processing in which the first image data is combined with the low resolution image data, according to a shooting operation.

According to the present invention, it is possible to realize an image processing technique with which high-speed processing is possible while maintaining noise removal performance.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention, and together with the description, serve to explain the principles of the invention.

DESCRIPTION OF EMBODIMENTS

Exemplary embodiments of the present invention will be described in detail below. It should be noted that the embodiments described hereinafter are merely exemplary. The embodiments may be modified or changed as appropriate depending on the configuration of the apparatus, the various conditions, and so on to which the present invention is applied, and the present invention is not intended to be limited to the embodiments described hereinafter. In addition, parts of the various embodiments described hereinafter may be combined as appropriate.

Embodiment 1

The configuration of an image processing apparatus of an image capturing apparatus according to Embodiment 1 of the present invention will be described with reference to FIG. 1.

Figure 1:
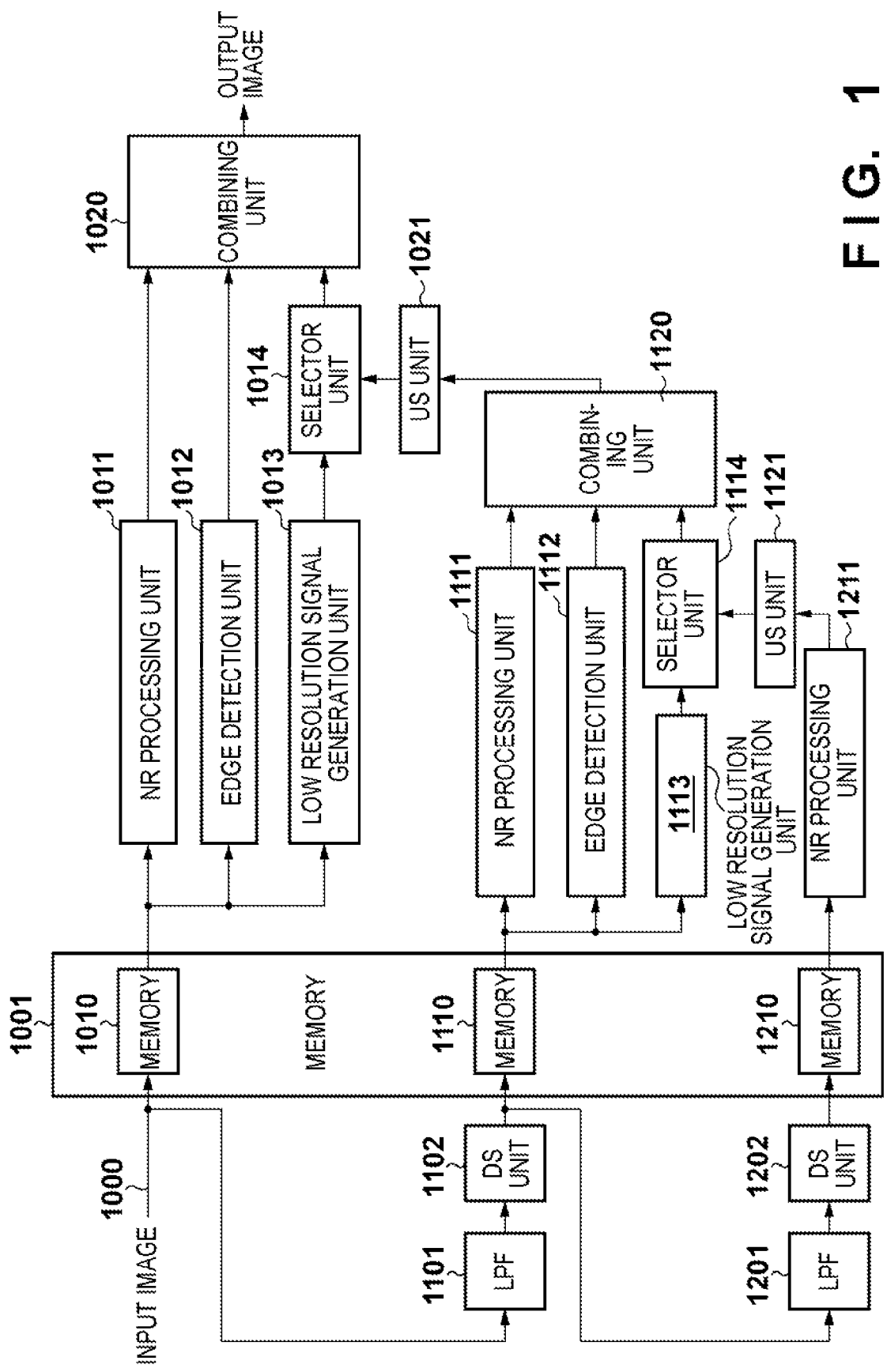
FIG. 1 is a block diagram illustrating a configuration of an image processing apparatus according to Embodiment 1 of the present invention.

In FIG. 1, input image data 1000 output from an imaging device of an image capturing apparatus such as a digital camera (not shown in the drawings) is stored in a memory 1010. A memory 1001 is configured by the memory 1010, a memory 1110 and a memory 1210. The input image data 1000 is input with image data on which known sensor correction processing such as fixed pattern noise correction or defective pixel correction has been performed. The input image data 1000 is subjected to LPF (low-pass filter) processing with a LPF 1101, and downsampling (reduction) processing in a DS unit 1102 such that image data of a first low resolution is generated, and the resultant data is stored in the memory 1110. Furthermore, image data output from the DS unit 1102 is subjected to LPF processing with a LPF 1201 and downsampling processing in a DS unit 1202 such that image data of a second low resolution that is lower than the first low resolution is generated, and the resultant image data is stored in the memory 1210. In this manner, image data of a plurality of layers having mutually different resolutions is generated.

Image data output from the memory 1010 is subjected to NR processing described below by a NR processing unit 1011. Also, image data output from the memory 1010 is input to an edge detection unit 1012. The edge detection unit 1012 is configured by a known edge detection filter, for example, and applies the edge detection filter to an input signal and obtains the output therefrom as an edge strength output signal. A low resolution signal generation unit 1013 generates a low resolution signal (image data) from the image data output from the memory 1010, which will be described below in detail. A selector unit 1014 switches between the low resolution signal output from the low resolution signal generation unit 1013 and a low resolution signal (image data) obtained by upsampling (enlarging) in a US unit 1021, according to the shooting operation. Note that the signal input to the US unit 1021 is image data output from a below-described combining unit 1120. A combining unit 1020 combines a high resolution signal (image data) output from the NR processing unit 1011 and a low resolution signal (image data) output from the selector unit 1014 according to the edge strength output signal output from the edge detection unit 1012. Specifically, the larger the edge strength output signal is (the stronger the edge is), the larger the ratio of the high resolution signal. Alternatively, the combining unit 1020 may be configured to select a high resolution signal when the edge strength output signal is greater than or equal to a threshold, and select a low resolution signal when the edge strength output signal is less than the threshold.

The above description is also applicable to the data output from the memory 1110, and thus a detailed description thereof will not be provided. The combining unit 1120 combines a high resolution signal output from a NR processing unit 1111 and a low resolution signal output from a selector unit 1114 according to the output from an edge detection unit 1112. Note that the selector unit 1114 switches between a low resolution signal output from a low resolution signal generation unit 1113 and a low resolution signal obtained by upsampling in a US unit 1121, according to the shooting operation. Data output from the memory 1210 is subjected to NR processing in an NR processing unit 1211, and then subjected to upsampling in the US unit 1121.

Note that in the present embodiment, first storage means of the present invention corresponds to the memory 1010, and second storage means corresponds to the memory 1110. Also, first image data corresponds to the input image data 1000, second image data corresponds to the image data stored in the memory 1110, and third image data corresponds to the image data stored in the memory 1210. Also, low resolution image generation means corresponds to the low resolution signal generation unit 1013, and second low resolution image generation means corresponds to the low resolution signal generation unit 1113. Also, first reducing means corresponds to the reducing unit 4002, second reducing means corresponds to the DS unit 1102 and third reducing means corresponds to the DS unit 1202. Furthermore, control means corresponds to the selector unit 1014 and the selector unit 1114. Furthermore, combining means corresponds to the combining unit 1020, and second combining means corresponds to the combining unit 1120. Furthermore, image data generated in the low resolution signal generation unit 1013 corresponds to low resolution image data, and image data generated in the low resolution signal generation unit 1113 corresponds to second low resolution image data. Furthermore, image data generated in the US unit 1021 corresponds to enlarged image data, and image data generated in the US unit 1121 corresponds to second enlarged image data.

First Image Processing

Figure 2A:
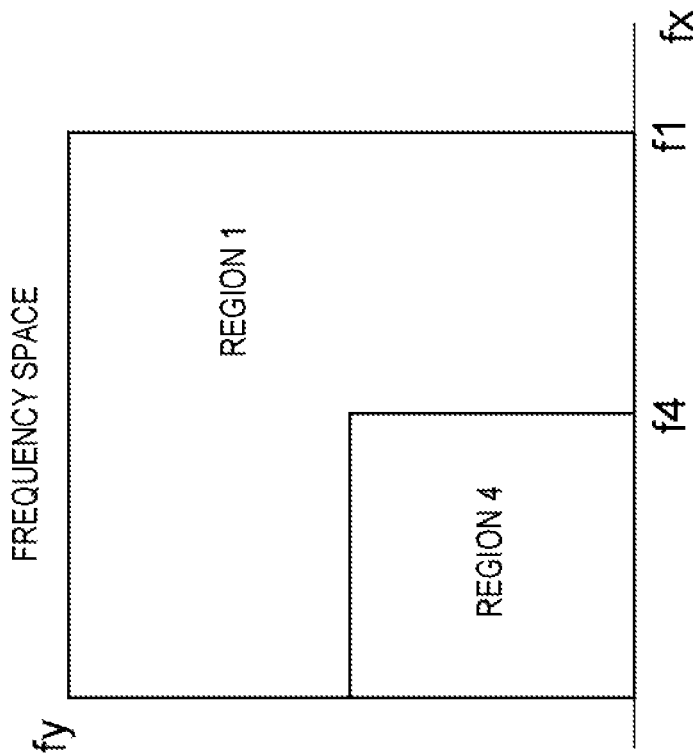
FIGS. 2A and 2B each illustrate a frequency space of image data of Embodiment 1.

First image processing will be described next. In the first image processing, the selector unit 1014 performs switching such that the low resolution signal obtained by upsampling in the US unit 1021 is output. Similarly, the selector unit 1114 performs switching such that the low resolution signal obtained by upsampling in the US unit 1121 is output. Accordingly, the first image processing uses data of all the three layers stored in the memories 1010, 1110 and 1210. FIG. 2A illustrates a frequency space of image data. A maximum frequency included in the image data in the memory 1010 is indicated by f1, a maximum frequency included in the image data in the memory 1110 is indicated by f2, and a maximum frequency included in the image data in the memory 1210 is indicated by f3 (f1>f2>f3).

Image data having the frequency f1 includes not only edge signals but also minute noise. The NR processing unit 1011 preserves the edge signals, and removes, as noise, a signal whose amplitude is too small to be an edge signal. For the NR processing, for example, a known method may be used in which the direction of the edge component included in an image is detected, smoothing processing is performed along the direction using a low-pass filter, thereby reducing noise. Although extremely low-level noise is removed by the NR processing unit 1011 in this case, in edge signal determination, an extremely low-level edge signal may be determined to be noise so as not to be determined to be an edge signal. In this case, the processing performed by the NR processing unit 1011 can be omitted.

Figure 2B:
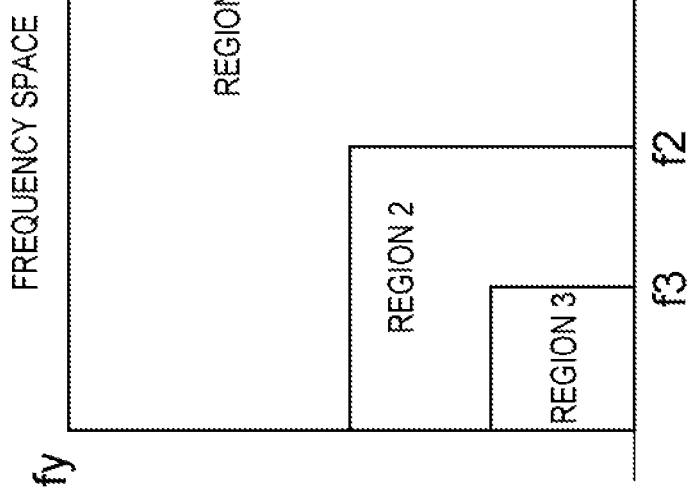

In this example, the edge detection unit 1012 is configured to detect an edge region in the image data of a frequency included in a region 1 shown in FIGS. 2A and 2B (frequency that is higher than f2 and lower than or equal to f1). In the case where the edge detection unit 1012 has detected that a pixel corresponds to an edge region, the combining unit 1020 increases the combination ratio of image data from the NR processing unit 1011 to image data from the selector unit 1014 in that pixel position in comparison to the combination ratio in the case where the pixel does not correspond to an edge region.

The edge detection unit 1112 is configured to detect an edge region in the image data of a frequency included in a region 2 shown in FIG. 2A (frequency that is higher than f3 and lower than or equal to f2). In the case where the edge detection unit 1112 has detected that a pixel corresponds to an edge region, the combining unit 1120 increases the combination ratio of image data from the NR processing unit 1111 to image data from the selector unit 1114 in that pixel position in comparison to the combination ratio in the case where the pixel does not correspond to an edge region.

In this manner, with respect to a pixel determined to correspond to an edge region in a high-resolution image, the combination ratio of high-resolution image to low-resolution image is increased in order to suppress a reduction in sharpness. On the contrary, with respect to a pixel that has not been determined to correspond to an edge region in the high-resolution image, the combination ratio of high-resolution image to low-resolution image is decreased such that noise is not noticeable. With the configuration described above, image data of an appropriate frequency is selected from image data of the respective layers.

Note that in the present embodiment, processing performed in the combining unit 1120 that involves combining a high resolution signal output from the NR processing unit 1111 with a low resolution signal output from the US unit 1121 corresponds to third image processing.

Second Image Processing

Next, second image processing will be described. In the second image processing, the selector unit 1014 performs switching such that a low resolution signal generated in the low resolution signal generation unit 1013 is output. Since only data in the memory 1010 is used in the second image processing, the bandwidth used for holding data in the memories 1110 and 1210 can be saved. The low resolution signal generation unit 1013 is configured by a 7×7 LPF, for example, and performs smoothing processing on input image data without performing downsampling processing, thereby generating a low resolution signal while maintaining the pixel count. FIG. 2B illustrates a frequency space of the image data, in which a maximum frequency of image data in the memory 1010 is f1, and a maximum frequency of image data output from the low resolution signal generation unit 1013 is indicated by f4 (f1>f4). The image signal generated by the low resolution signal generation unit 1013 is generated using only a LPF including a finite number of taps, and thus the image quality is lower than that of image data generated by performing downsampling processing in the DS unit 1102.

Here, in the case where the edge detection unit 1012 has detected that a pixel corresponds to an edge region, the combining unit 1020 increases the combination ratio of image data from the NR processing unit 1011 to image data from the selector unit 1014 in that pixel position in comparison to the combination ratio in the case where the pixel does not correspond to an edge region.

Thus, although there are two types of switching, image data of an appropriate frequency is selected from the image data of the respective layers by the selector units. Also, as another pattern of the second image processing, the selector unit 1114 may perform switching so as to output a low resolution signal generated by the low resolution signal generation unit 1113, and the selector unit 1014 may perform switching so as to output a low resolution signal obtained by upsampling in the US unit 1021. Specifically, the combining unit 1120 combines image data from the NR processing unit 1111 with image data from the low resolution signal generation unit 1113, and the combining unit 1020 combines image data from the NR processing unit 1011 with image data from the US unit 1021. Note that a maximum frequency of the low resolution signal output from the low resolution signal generation unit 1113 is indicated by f5 (not shown) (f4>f5).

Although the bandwidth for storing data in the memory 1110 cannot be saved in this example, it is possible to reduce part of the memory capacity and bandwidth by using a low resolution signal from the resolution signal generation unit as image data at an intermediate layer. Furthermore, it is possible to expect that the image quality is better than that obtained in the case where the selector unit 1014 selects a low resolution signal generated by the low resolution signal generation unit 1013.

Note that in the present embodiment, processing performed in the combining unit 1120 for combining a high resolution signal output from the NR processing unit 1111 with a low resolution signal output from the generation unit 1113 corresponds to fourth image processing.

As described above, in the first image processing, by using a low resolution signal obtained by upsampling as image data, it is possible to select image data of an appropriate frequency more particularly according to the frequencies of image data, and thereby it is possible to achieve a higher NR effect.

In the second image processing, by using a low resolution signal from the low resolution signal generation unit as image data, necessary memory capacity and bandwidth can be reduced, which enables high-speed processing.

In the present embodiment, although three layers of processing is described in the first image processing, the present invention is not limited to this, and processing including N layers (N>2) may be performed.

Also, in the case where the selector unit 1014 selects image data output from the low resolution signal generation unit 1013, it is possible to input the input image data 1000 directly into the NR processing unit 1011, the edge detection unit 1012 and the low resolution signal generation unit 1013. In this manner, performing processing without storing image data in the memory 1001 becomes possible, and thereby it is possible to reduce necessary memory capacity and bandwidth.

Similarly, in the case where the selector unit 1114 selects image data output from the low resolution signal generation unit 1113, it is possible to input image data output from the DS unit 1102 directly into the NR processing unit 1111, the edge detection unit 1112 and the low resolution signal generation unit 1113. In this manner, performing processing without storing image data in the memory 1110 and the memory 1210 becomes possible, and thereby it is possible to reduce necessary memory capacity and bandwidth.

In digital cameras, a plurality of shooting functions are provided in addition to a function for shooting still images, such as a moving image recording function and a high-speed shooting function. In the case where shooting is performed in the moving image recording mode or the high-speed continuous shooting mode, memory bandwidth is of particular concern.

Accordingly, in the case where a camera is set to a moving image recording mode, a high-speed continuous shooting mode or the like so that a large amount of memory bandwidth is consumed, the second image processing may be set to reduce necessary memory capacity.

Also, even if the high-speed continuous shooting mode is set, high-speed continuous shooting is not always performed indefinitely. Therefore, control may be performed such that the remaining capacity of the memory 1001 is detected and when the remaining capacity has become less than a threshold, the first image processing is switched to the second image processing. Here, needless to say, the threshold of the remaining capacity is switched depending on the shooting operation (for example, still image shooting and moving image recording) of the camera.

Figure 3:
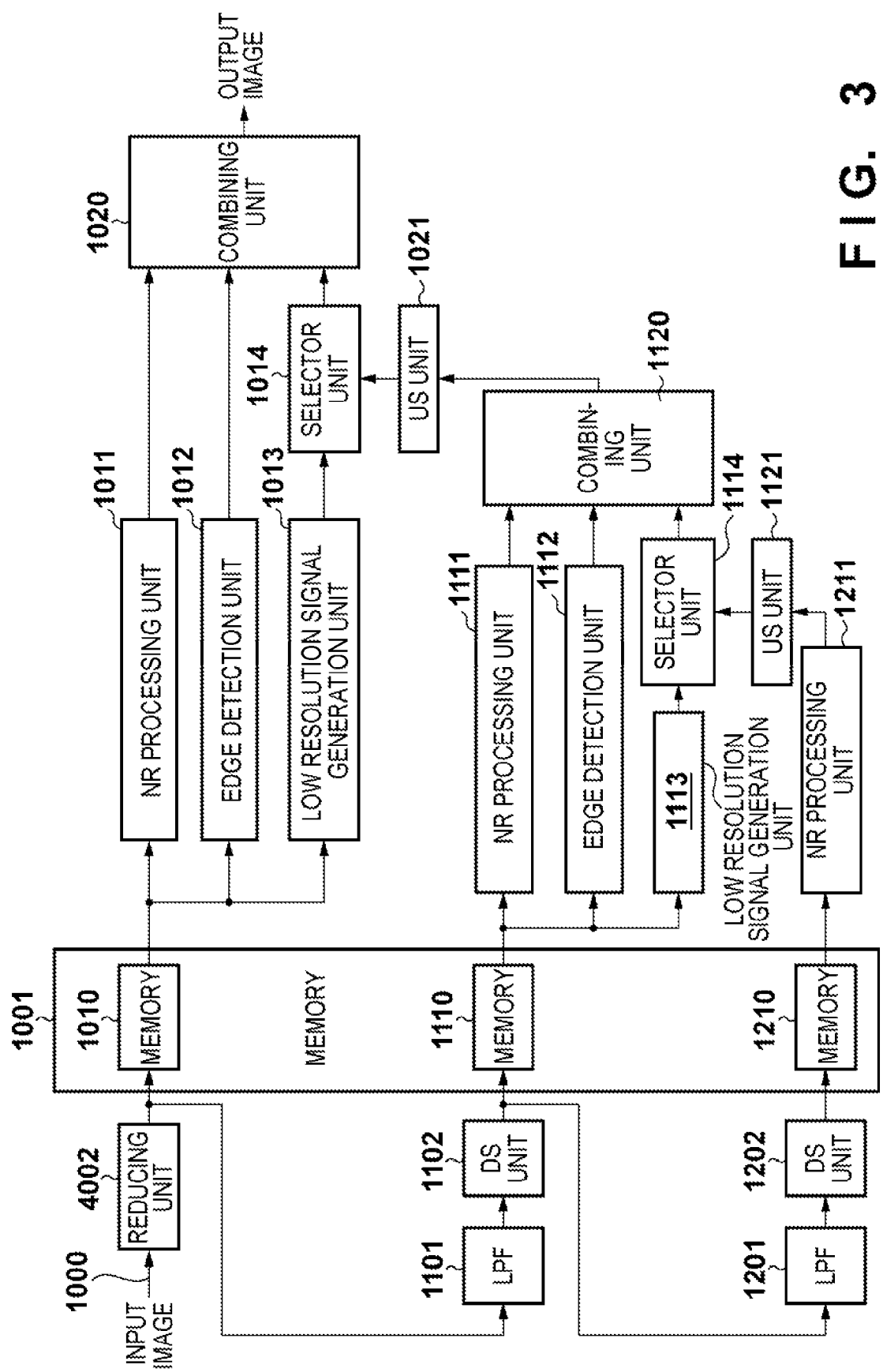
FIG. 3 is a block diagram illustrating a configuration of a variation of Embodiment 1.

Also, as with a variation shown in FIG. 3, a configuration may be adopted in which a reducing unit 4002 that reduces the input image data 1000 may be added to the configuration in FIG. 1, as third reducing means in a stage preceding the memory 1001. For example, in the case where the required size of the output image is 1/n times the size of the input image, by the reducing unit 4002 performing processing for reducing the original image size to 1/n, the capacity of the memories 1010, 1110 and 1210 can be reduced to 1/n. Since constituent elements other than the reducing unit 4002 are the same as those in FIG. 1, the same reference numerals are assigned, and description thereof will not be provided.

Other Embodiments

The present invention can be also realized by executing the following processing, that is, processing in which software (program) realizing the functions of the foregoing embodiments is supplied to a system or apparatus via a network or from a storage medium of various types, and a computer (or CPU or MPU, etc.) of the system or apparatus reads out and executes program code. In this case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252207, filed Nov. 10, 2010, which is hereby incorporated by reference herein in its entirety.

The invention claimed is:

1. An image capturing apparatus comprising:
a CPU and non-transitory storage medium including:
a first storage unit configured to store first image data;
a first reducing unit configured to reduce the first image data and generate second image data of a low resolution;
an enlarging unit configured to generate enlarged image data, which is obtained by enlarging image data generated by performing predetermined processing on the second image data to a pixel count that is the same as that of the first image data;
a low resolution image generation unit configured to generate low resolution image data from the first image data through processing that is different from that performed by the first reducing unit, the low resolution image data having the same pixel count as the first image data and a lower resolution than that of the first image data;
a combining unit configured to execute one of first image processing in which the first image data is combined with the enlarged image data, and second image processing in which the first image data is combined with the low resolution image data; and
a control unit configured to switch processing executed by the combining unit between the first image processing and the second image processing, according to a shooting operation.

2. The apparatus according to claim 1,
wherein in the second image processing, the first image data is output to the combining unit without being stored in the first storage unit.

3. The apparatus according to claim 1,
wherein the control unit performs control such that in a case where the shooting operation is in a moving image recording mode or a high-speed continuous shooting mode, the combining unit executes the second image processing.

4. The apparatus according to claim 1, further comprising:
a unit configured to detect a remaining capacity of the first storage-unit,
wherein the control unit performs control such that in a case where the remaining capacity is lower than a threshold, the combining unit executes the second image processing.

5. The apparatus according to claim 1, further comprising:
a second storage unit configured to store the second image data;
a second reducing unit configured to reduce the second image data and generate third image data of a low resolution;
a second enlarging unit configured to generate second enlarged image data, which is obtained by enlarging image data generated by performing predetermined processing on the third image data to a pixel count that is the same as that of the second image data;
a second low resolution image generation unit configured to generate second low resolution image data from the second image data through processing that is different from that performed by the second reducing unit, the second low resolution image data having the same pixel count as the second image data and a lower resolution than that of the second image data; and
a second combining unit configured to perform one of third image processing in which the second image data is combined with the second enlarged image data, and fourth image processing in which the second image data is combined with the second low resolution image data,
wherein the control unit switches processing executed by the second combining unit between the third processing and the fourth image processing, according to the shooting operation, and
the enlarged image data is data obtained by the enlarging unit enlarging image data generated by the second combining unit.

6. The apparatus according to claim 5,
wherein the control unit performs control such that in the case where the shooting operation is in a moving image recording mode or a high-speed continuous shooting mode, the second combining unit executes the fourth image processing.

7. The apparatus according to claim 1, further comprising, in a stage preceding the first storage unit and the first reducing unit, a third reducing unit configured to reduce an image size of the first image data.

8. A control method of an image capturing apparatus, comprising:
a step of storing first image data;
a step of reducing the first image data and generating second image data of a low resolution;
a step of generating enlarged image data, which is obtained by enlarging image data generated by performing predetermined processing on the second image data to a pixel count that is the same as that of the first image data;
a step of generating low resolution image data from the first image data through processing that is different from that performed in the reducing step, the low resolution image data having the same pixel count as the first image data and a lower resolution than that of the first image data; and
a step of switching between execution of first image processing in which the first image data is combined with the enlarged image data and second image processing in which the first image data is combined with the low resolution image data, according to a shooting operation.

9. The method according to claim 8, wherein in the second image processing, the first image data is output without being stored in the step of storing the first image data.

10. The method according to claim 8, wherein in a case where the shooting operation is in a moving image recording mode or a high-speed continuous shooting mode, the second image processing is executed.

11. The method according to claim 8, further comprising a step of detecting a remaining capacity in the step of storing the first image data,
wherein in a case where the remaining capacity is lower than a threshold, the second image processing is executed.

12. The method according to claim 8, further comprising:
a step of storing the second image data;
a step of reducing the second image data and generating third image data of a low resolution;

a step of generating second enlarged image data, which is obtained by enlarging image data generated by performing predetermined processing on the third image data to a pixel count that is the same as that of the second image data;

a step of generating second low resolution image data from the second image data through processing that is different from that performed in the step of reducing the second image data, the second low resolution image data having the same pixel count as the second image data and a lower resolution than that of the second image data; and a combining step of performing one of third image processing in which the second image data is combined with the second enlarged image data, and fourth image processing in which the second image data is combined with the second low resolution image data, wherein in the switching step, processing executed in the combining step between the third processing and the fourth image processing is switched, according to the shooting operation, and the enlarged image data is data obtained by enlarging image data generated by the combining step.

13. The method according to claim 12, wherein in the case where the shooting operation is in a moving image recording mode or a high-speed continuous shooting mode, the fourth image processing is executed in the combining step.

14. The method according to claim 8, further comprising, in a stage preceding the step of storing the first image data and the step of reducing the first image data, a step of reducing an image size of the first image data.

* * * * *